United States Patent [19]
Simpson

[11] Patent Number: 5,462,493
[45] Date of Patent: Oct. 31, 1995

[54] DUAL BLADE CHAIN TENSIONER WITH DAMPING

[75] Inventor: Roger T. Simpson, Ithaca, N.Y.

[73] Assignee: Borg-Warner Automotive, Inc., Sterling Heights, Mich.

[21] Appl. No.: 333,267

[22] Filed: Nov. 2, 1994

[51] Int. Cl.⁶ ........................................................ F16H 7/08
[52] U.S. Cl. .......................................... 474/111; 474/140
[58] Field of Search ........................... 474/101, 109–111, 474/113–117, 133–138, 140

[56] References Cited

U.S. PATENT DOCUMENTS

| | | |
|---|---|---|
| 3,490,302 | 1/1970 | Turner et al. . |
| 4,921,472 | 5/1990 | Young . |
| 5,055,088 | 10/1991 | Cradduck et al. . |
| 5,222,917 | 6/1993 | Shimaya et al. . |
| 5,266,066 | 11/1993 | White . |
| 5,318,482 | 6/1994 | Sato et al. .................................. 474/111 |

*Primary Examiner*—Michael Powell Buiz
*Attorney, Agent, or Firm*—Willian, Brinks, Hofer, Gilson & Lione; Greg Dziegielewski

[57] ABSTRACT

The present invention is directed to a blade-type chain tensioner having two shoes and a blade spring, with one shoe adapted to impart tension to a chain and overlapping the other shoe which is connected to the blade spring. The present invention includes a method for assembling a dual blade chain tensioner comprising the steps of providing a blade spring and two shoes, positioning the blade spring into slots in each shoe and then rotating one shoe over the other shoe and towards the blade spring. A temporary locking pin may be attached to hold the assembly together.

19 Claims, 3 Drawing Sheets

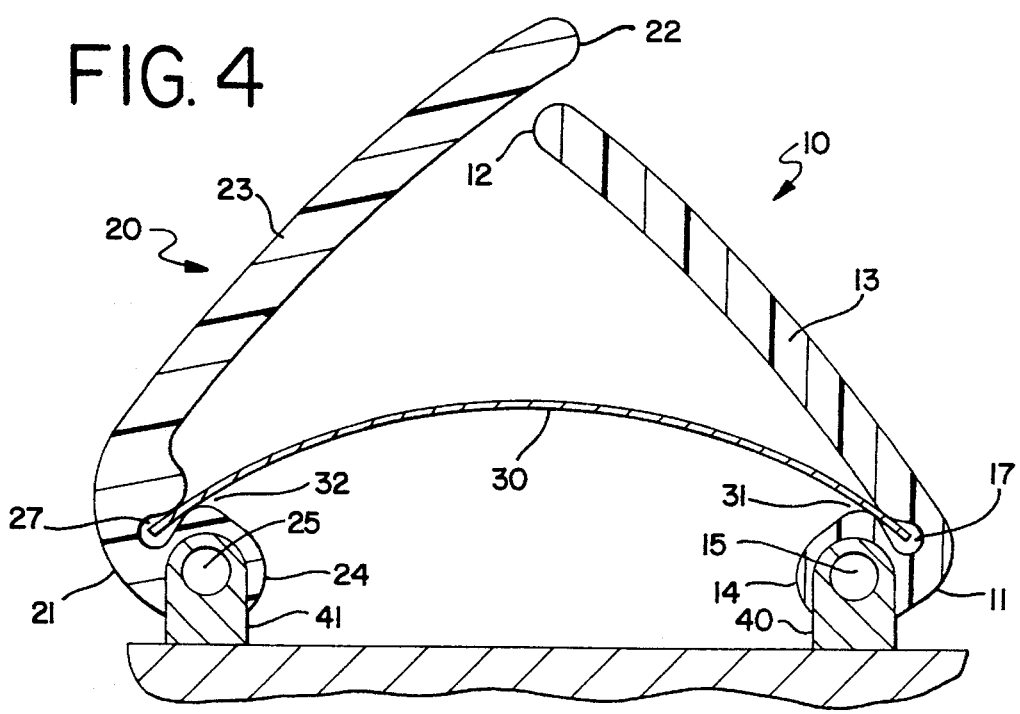
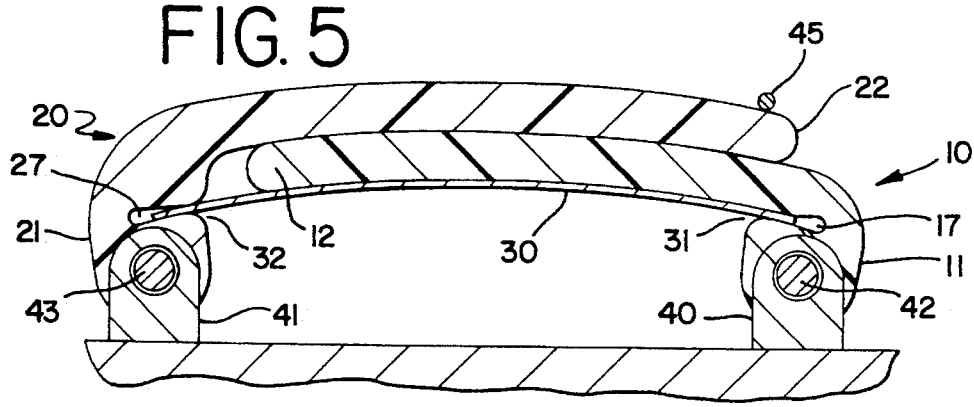
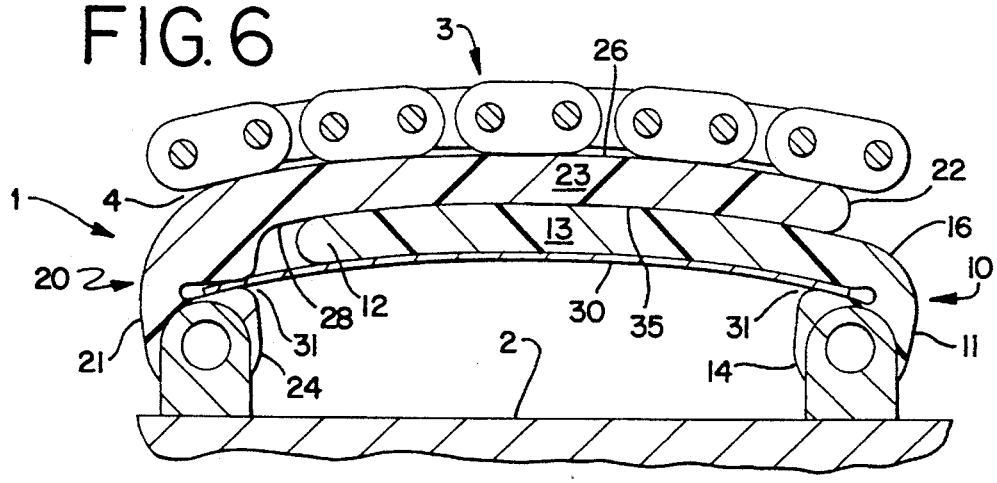

DUAL BLADE CHAIN TENSIONER WITH DAMPING

BACKGROUND OF THE INVENTION

This invention relates to tensioners used with chain drives in automotive timing applications and more particularly to a blade-type chain tensioner in which two shoes overlap each other.

Tensioning devices are used as a control device for a power transmission chain as the chain travels between a plurality of sprockets. Generally, it is important to impart and maintain a certain degree of tension to the chain to prevent noises or slippage. Prevention of slippage is especially important in the case of a chain driven camshaft in an internal combustion engine because slippage may alter the camshaft timing by several degrees, possibly causing damage. In the harsh environment in which an internal combustion engine operates, chain tension can vary between excessively high or low levels as a result of the wide variations in temperature and differences between the coefficients of linear expansion among the various parts of the engine, including the chain and the tensioner. Camshaft and crankshaft induced torsional vibrations cause chain tension to vary considerably. This tension variation results in chain elongation. Moreover, wear of the chain components during prolonged use can cause elongation of the chain that results in a decrease in the tension of the chain.

Generally, blade-type chain tensioners use a blade spring interlocked under tension with a single shoe to provide tension to a chain. The blade spring is arcuate in shape and the shoe is relatively flat. The shoe is constructed from a semi-rigid material which will deform or "creep" upon experiencing a load at a high temperature. The blade spring is flattened to correspond to the shape of the shoe and then interlocked with it. Because the semi-rigid shoe prevents the blade spring from returning to its original more arcuate shape, the blade spring applies a load to the shoe. During operation, as the heat from the engine causes the temperature of the shoe to increase and become less rigid, the load from the blade spring causes the shoe to deform to a more arcuate shape. Through such deformation, tension is provided to a chain. The chain tensioner assembly is positioned along a free length of the chain between the sprocket gears. As the blade spring forces the shoe into a more arcuate shape, the apex of the shoe extends farther into the span of chain thereby increasing chain tension.

Typical blade-type chain tensioners have interlocked a blade spring to only a single shoe. For example, U.S. Pat. No. 3,490,302, to Turner et al., discloses a chain tensioner where the blade spring is mounted to mechanically interlock with, and thereby provide a load to, a shoe through a hole and pin combination. The blade spring continuously bears against the shoe.

Another structure for mounting a blade spring to a single shoe is disclosed in U.S. Pat. No. 4,921,472, to Young et al. This reference discloses a blade-type tensioner having a blade spring mechanically interlocked with a shoe through a passageway in the end of the shoe without the use of a pin.

Yet another structure for mounting a blade spring to a single shoe is disclosed in U.S. Pat. No. 5,055,088, to Cradduck et al. This reference discloses a blade-type tensioner which utilizes a plurality of blade springs interlocked with a single plastic shoe through a passageway in the shoe and fastened using a pin.

An improved construction for mounting a blade spring to a shoe is disclosed in U.S. Pat. No. 5,266,066, to White, incorporated herein by reference. This reference discloses a blade-type chain tensioner in which a blade spring is constructed from a simple rectangular metal band formed into an arcuate shape and interlocked with a pocket in a shoe to provide a load to the shoe.

Unfortunately, the prior art blade-type chain tensioners have certain drawbacks. For one, the range of the arcuate shape of the shoe is limited. With timing chains that have longer sprocket gear center distances, as the chain temporarily lengthens due to varying operating temperature and tension variation, the chain achieves greater vertical movement compared to a chain having a shorter center distance. Also, the chain may permanently lengthen due to wear and permit increased vertical movement of the chain between the sprocket gear centers. To limit this vertical movement and take up this additional slack, the chain tensioner would have to bend to a more arcuate shape. However, the prior art chain tensioners may not be able to bend enough to meet the chain with adequate force to maintain the proper tension on the chain because the prior art tensioners resist great changes in shape. Usually, a much stronger blade spring is required to place a higher initial pre-load on the shoe to force it to the more arcuate shape necessary to take up the additional slack in the chain when it has aged and lengthened. Unfortunately, the stronger blade spring may cause the chain tensioner to impart too high a tension on a new chain during initial operation.

Another drawback of the prior art blade-type chain tensioners is that they are prone to prolonging oscillation of the chain. As discussed above, the harsh operating conditions and torsional vibrations of the engine induces varying tension in the chain. The blade spring reacts to the varying tension in the chain imparted by the torsional vibrations. Depending on the vibrational frequency, the spring force of the blade spring may react with a resonant vibration that establishes a prolonged oscillation of the chain. It is desirable to minimize this oscillation and maintain a constant tension on the chain.

The present invention provides a blade-type chain tensioner that addresses these limited arcuate range and oscillation problems. By providing two chain tensioner shoes in an overlapping configuration, one shoe imparts tension to the chain, but the other shoe damps the movement of the first shoe to reduce the oscillations. The overlapping shoe configuration also allows a greater range of arcuate movement so that the chain tensioner is able to meet the greater transverse movement associated with a longer center length timing chain. The present invention attempts to achieve greater arcuate movement with a lower initial blade spring tension.

SUMMARY OF THE INVENTION

In one embodiment, the present invention includes a blade-type chain tensioner having two shoes and a blade spring. One shoe has a spring slot and is fixedly attached to a support. The other shoe is arcuately shaped with a spring slot in one end that is pivotably attached to a support, with the distal end of the shoe overlapping and contacting the first shoe. The blade spring has two ends that engage the spring slot in each shoe and imparts a spring tension on the shoes.

In another embodiment, the present invention includes a blade-type chain tensioner having an arcuately shaped first shoe with a convex surface and with a spring slot in an end that has a bore for pivotable attachment to a support. An arcuately shaped second shoe has a concave surface and a spring slot in an end that has a bore for pivotable attachment to another support. The concave surface of the second shoe slidably overlaps the convex surface of the first shoe to define a slidable region of contact where a viscous fluid layer is formed to dampen the sliding movement. A blade spring has two ends that engage the spring slots in the two shoes and bears against the first shoe to impart a spring tension to the shoes.

In a third embodiment, the tensioner includes two shoes and two blade springs. Each shoe has a spring chamber wherein a blade spring is disposed and imparts a spring tension to the shoe. One arcuately shaped shoe with a convex surface has a knurl at one end pivotably attached to a support and the other end slidably contacting a stop. The other arcuately shaped shoe has a knurl at one end pivotably attached to a support and a concave surface that overlaps and slidably contacts a portion of the convex surface of the first shoe. A viscous fluid layer is formed in the slidable contact region between the concave and convex surfaces.

The present invention also provides a method of assembling a dual blade chain tensioner. The method includes providing two shoes and a blade spring. The shoes are pivotably attached to supports and opened apart to permit easier access to the spring slots. One end of the blade spring is inserted into a spring slot in one shoe and the opposite end of the blade spring is inserted into a spring slot in the other shoe. The shoes are rotated together towards the blade spring with one shoe bearing against the blade spring and the other shoe overlapping the first shoe. The shoes are pressed against the spring to deform the shape of spring so that it substantially corresponds to the flatter shape of the shoes. A temporary locking pin may be placed over the shoes to hold the assembly in place against the spring tension.

BRIEF DESCRIPTION OF THE DRAWINGS

FIG. 4 is a side view of the dual blade chain tensioner of FIG. 1 illustrating the blades in open position during assembly.

FIG. 5 is a side view of the dual blade chain tensioner of FIG. 1 after assembly showing the device with a temporary locking pin in position.

FIG. 6 is a side view of the dual blade chain tensioner of FIG. 1 showing the device installed in position adjacent to a portion of a chain.

DETAILED DESCRIPTION OF THE PREFERRED EMBODIMENTS

Figure 1:
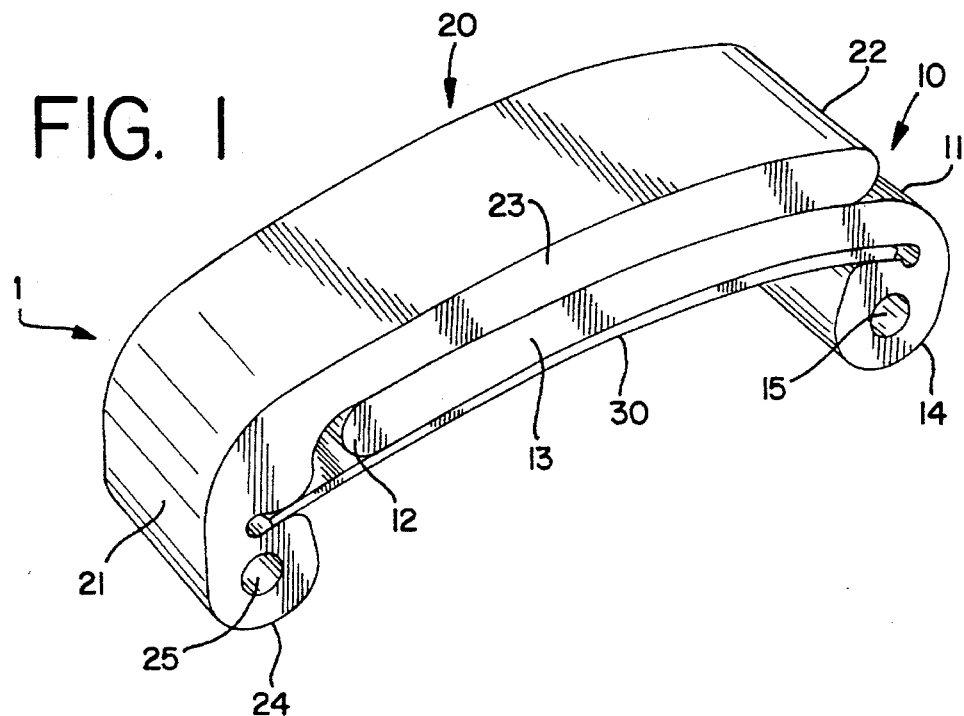
FIG. 1 is a perspective view of one embodiment of a dual blade chain tensioner.
Figure 2:
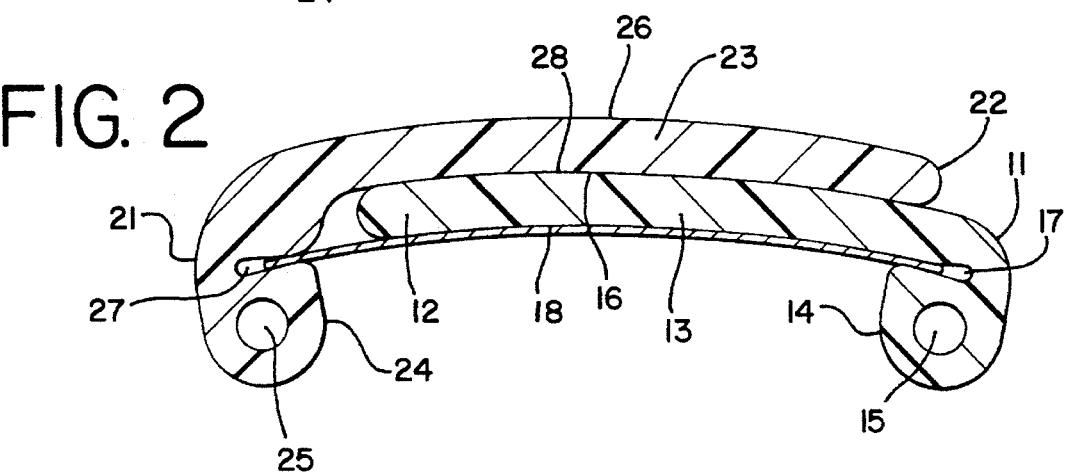
FIG. 2 is a side view of the dual blade chain tensioner of FIG. 1.
Figure 3:
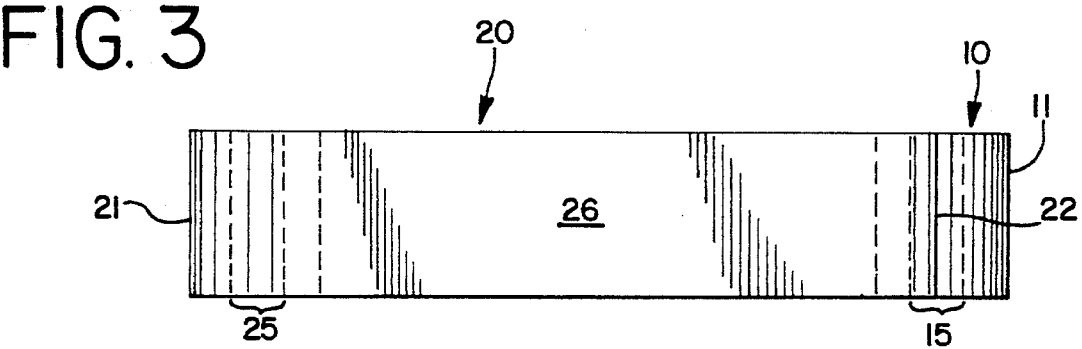
FIG. 3 is a top plan view of the dual blade chain tensioner of FIG. 1.

Turning now to the drawings, FIG. 6 depicts one embodiment of the dual blade chain tensioner of the present invention shown installed adjacent to a chain 3. The dual blade chain tensioner 1 is mounted on a stationary supporting surface 2 to position the chain tensioner 1 to apply tension to the chain 3. The tensioner 1 includes two blades 10 and 20, also known as shoes, and a blade spring 30. Each end 11 and 21 of the shoes is pivotally attached to two supports 40 and 41, respectfully, on the stationary supporting surface 2.

For ease of description, the direction toward the chain 3 relative to the stationary supporting surface 2 will be described as "up." It will be understood by one skilled in the art, however, that the chain is adjacent to the tensioner regardless of the actual direction relative to the stationary supporting surface 2 when the tensioner is installed in an engine. Accordingly, the upper shoe 20 is positioned against the underside 4 of the chain 3. The upper shoe 20 overlaps the lower shoe 10. The lower shoe 10 is positioned over and against the blade spring 30. One end 31 of the blade spring engages the pivotally attached end 11 of the lower shoe 10 and the second end 32 engages the pivotally attached end 21 of the upper shoe 20.

The blade spring 30 provides a spring tension in the upward direction toward the chain that forces the upper shoe 20 against the chain so as to impart a tension in the chain. Generally, a change in the tension in the chain causes a vertical movement of the chain. Increased tension from the chain drive (not shown) causes a downward movement of the chain that forces both the lower shoe 10 and the upper shoe 20 downward. Corresponding to the downward movement of the shoes, the upper shoe 20 slides across the lower shoe 10. The physical contact of the two shoes 10 and 20 damps the relative movement of the shoes caused by fluctuating chain tension and reacting spring forces.

As shown in FIGS. 1–4, the lower shoe 10 is arcuately shaped at a first formation radius. The lower shoe 10 has a knurl 14 at a proximal end 11 with an opening 15, or bore, to permit pivotal attachment of the shoe 10. An arm 13 extends in an arc from the proximal end 11 to the distal end 12 and has an upper convex surface 16 and a lower concave surface 18. A spring slot 17 is located between the knurl 14 and the arm 13 generally in the area where the lower concave surface 18 joins the knurl 14. The spring slot 17 extends across the full width of the lower shoe.

The upper shoe 20 is arcuately shaped at a second formation radius that is similar to the lower shoe. The upper shoe has a knurl at a proximal end 21 with an opening 25, or bore, to permit pivotal attachment of the shoe 20. An arm 23 extends in an arc from the proximal end 21 to the distal end 22 and has an upper convex surface 26 and a lower concave surface 28. A spring slot 27 is located between the knurl 24 and the arm 23 generally in the area below the arm 23 about a distance equivalent to the thickness of the arm 13 of the lower shoe 10. The spring slot 27 extends across the full width of the upper shoe.

The lower shoe 10 and upper shoe 20 may be made of a synthetic material, such as nylon, which will "creep" or deform under elevated load at a high temperature. For example, Nylon 6/6 is one commercially available material that may be used. The shoes may also be a composite of materials, such as Nylon 6/6 with a glass fill. A resilient deformable material is desirable because during operation, the heat from the engine will cause the shoes to deform and become more arcuate under the load from the blade spring 30. The greater arcuate shape of the shoes 10 and 20 at higher temperatures meets the need for keeping tension on the chain 3 as it thermally expands in length.

Alternatively, different materials may be used in the upper shoe 20 and lower shoe 10. For example, the upper shoe 20 may use PEEK (polyester ethylene ketone) for its greater wearability and durability characteristics, and the lower shoe 10 may use Nylon 6/6. Preferably, if different materials are used, the upper shoe should be the harder more durable material and the lower shoe should be the softer more flexible material. The material for the lower shoe may also be selected to optimize the sliding resistance between the upper and lower shoes.

The blade spring 30 may be made of any suitable material, typically a heat-treated spring steel. Such materials are readily available and known to one skilled in the art. The blade spring 30 is generally rectangular and arcuately shaped at a third formation radius that is less than the formation radii of the shoes. In other words, the blade spring 30 is formed with a tighter curvature than the shoes, which appear relatively flat in comparison. The rectangular shape of the blade spring 30 ensures an evenly distributed tension across its full length and across its full width at the ends 31 and 32 of the blade spring 30 in the spring slots 17 and 27. The spring tension causes the ends 31 and 32 to tightly engage the surfaces of the spring slots 17 and 27 to interlock the blade spring 30 with the shoes.

As shown in FIGS. 4–6, the shoes rotate about the supports 40 and 41. The proximal ends 11 and 21 of the shoes are connected to pins 42 and 43 which pass through the bores 15 and 25 of the knurls 14 and 24 and connect to the supports 40 and 41. The shoes are each positioned to rotate in the opposite direction upon an upwardly applied spring tension. The axes of rotation are substantially parallel so that the upper shoe 20 squarely overlaps the lower shoe 10. A substantial portion of the concave surface 28 of the upper shoe overlaps and slidably contacts a substantial portion of the convex surface 16 of the lower shoe. These opposing surfaces define a region of slidable contact 35. An upwardly applied spring tension causes the shoes to rotate upwards in opposite rotational directions with the result that the opposing surfaces 16 and 28 slide across each other.

The structure of this embodiment of the present invention offers several advantages. First, because only the proximal end 11 and 21 of each shoe engages the blade spring 30 and the distal end 12 and 22 of each shoe is free, the range of movement of the blade spring is not constrained by the shoes. Rather, the overlapping shoes 10 and 20 may slide as far apart as needed to permit the blade spring to bend to a more arcuate shape to maintain tension on the chain. Second, the overlapping shoes may include a sliding resistance to damp vibration or movement of the chain. Another advantage is that the shoes may be made of different materials to optimize the overall performance of the chain tensioner under different uses, vis-a-vis the specific functions of the upper and lower shoes.

It is preferred that the dual blade chain tensioner 1 be installed so that during normal operation the chain 3 moves from the proximal end 21 to the distal end 22 of the upper shoe 20. It will be understood that this will avoid the possibility of the free distal end 22 of the upper shoe from catching or interfering with the chain 3. The tensioner is positioned so that the chain generally follows the contour of the arcuate convex surface 26 of the upper shoe. However, the load from the chain causes the shoes deform to the corresponding arcuate shape of the blade spring 30 as determined by the balancing of the loads between the blade spring and the chain. The opposing loads of the chain and the blade spring 30 generally force the upper and lower shoes into the same arcuate shape so that the opposing surfaces 16 and 28 remain in slidable contact.

Figure 7:
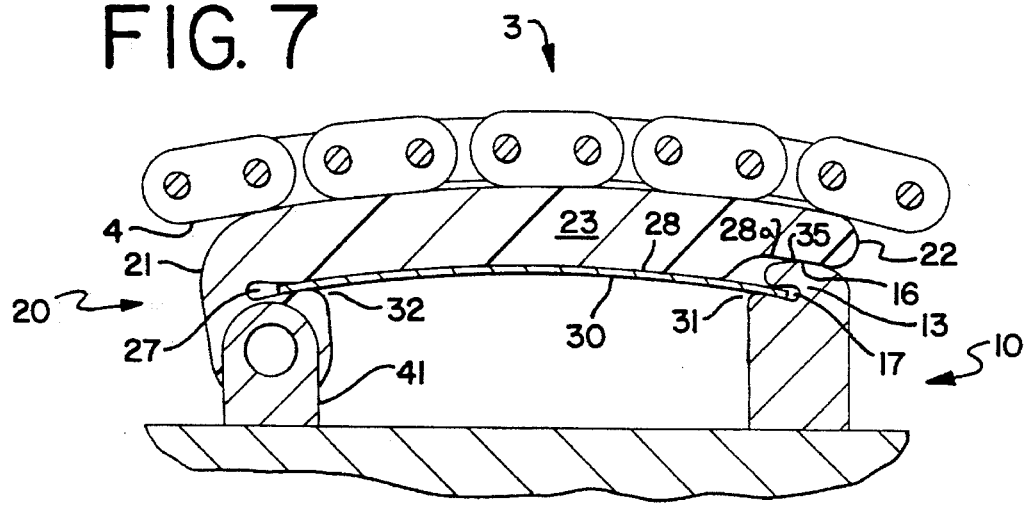
FIG. 7 is side view of another embodiment of a dual blade chain tensioner.

Another embodiment of a dual blade chain tensioner is shown in FIG. 7. This embodiment includes a first shoe 10, a second shoe 20 and a single blade spring 30. The arm 13 of the lower shoe has a significantly shorter length than the arm 23 of the upper shoe. The distal end 22 of the upper shoe overlaps the supporting surface 16 of the lower shoe. The lower shoe 10 is fixedly attached to the stationary support surface 2. The upper shoe is pivotally attached to a support 41. One end 31 of the blade spring 30 engages the spring slot 17 in the lower shoe and the other end 32 engages the spring slot 27 in the upper shoe.

Only a relatively small portion of the concave surface 28a of the upper shoe 20 contacts the supporting surface 16 of the lower shoe 10. This results in a correspondingly small region of slidable contact 35. The load from the chain maintains the upper shoe in contact with the lower shoe. The portion of the concave surface 28 of the upper shoe 20 that is not overlapping the lower shoe 10 contacts the blade spring 30.

The structure of this embodiment of the present invention offers much of the same advantages of the embodiment discussed above. This tensioner provides greater range of movement, provides sliding resistance between the shoes and different materials may be used for each shoe. In addition, this embodiment reduces the number of parts required in the tensioner. A lower cost tensioner may be provided by making the lower shoe 10 significantly shorter than the upper shoe 20 and fixedly attaching the lower shoe to a stationary support surface 2. Although this embodiment has a relatively small region of slidable contact 35, the structure achieves the functionality of the present invention with only one pivotable shoe 20 and correspondingly fewer parts.

Figure 8:
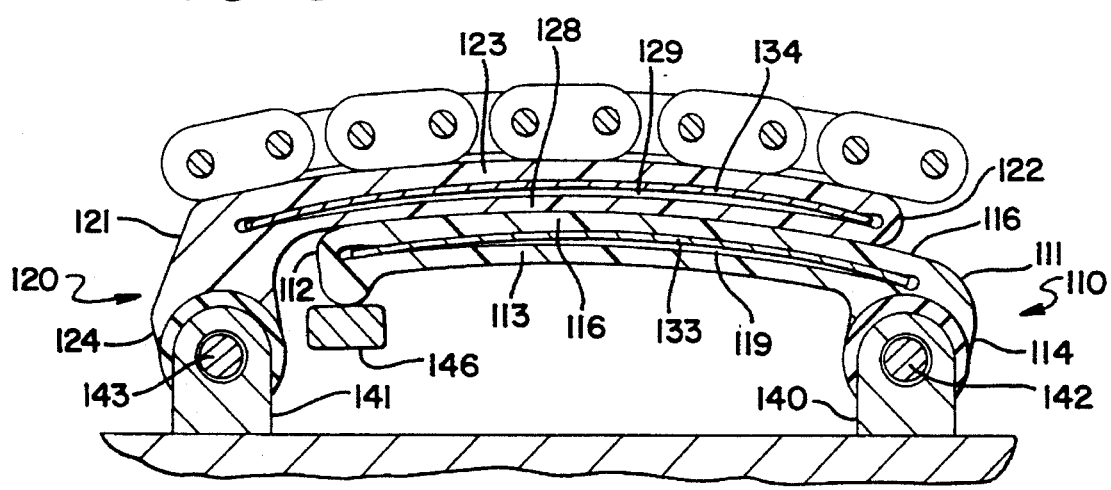
FIG. 8 is a side view of yet another embodiment of a dual blade chain tensioner.

Another embodiment of a dual blade chain tensioner according to the present invention is shown in FIG. 8. This embodiment of a dual blade chain tensioner encloses individual blade springs 133 and 134 within each shoe 110 and 120. A spring chamber 119 within the lower shoe contains a blade spring 133. A spring chamber 129 within the upper shoe contains another blade spring 134. The blade springs 133 and 134 extend substantially the full length of the arms 113 and 123. Each blade spring 133 and 134 independently imparts a spring tension on the shoes 110 and 120, respectively, in the manner as described in U.S. Pat. No. 5,266,066, incorporated herein by reference.

Even though each shoe 110 and 120 in this embodiment has an independent spring tension imparted on it, the principles of the present invention are evident in the overlapping cooperation of the upper shoe 120 and the lower shoe 110. The upper shoe 120 imparts tension to a chain 3, while the lower shoe 110 imparts tension to the upper shoe 120. The lower shoe 110 also includes a convex surface 116 that is in slidable contact with the concave surface 128 of the upper shoe 120. The distal end 112 of the lower shoe 110 is slidably positioned against a stationary stop 146 to bias the position of the tensioner with respect to the chain. The proximal ends 111 and 121 of the shoes are pivotally mounted to two supports 140 and 141.

It is to be understood that this embodiment may function with a blade spring 133 contained only in the lower shoe 110 and no other blade spring in the upper shoe 120. In other words, the upper shoe 20, as shown in FIG. 6, may be placed in the position of the upper shoe 120 in FIG. 8. In this combination (not shown), the spring tension would be transmitted from the lower shoe 110 through the upper shoe 20 to the chain 3. Nevertheless, it is preferred that each shoe 110 and 120 have a separate self-contained blade spring 133 and 134.

According to the present invention, the upper shoe 120 may have various positions relative to the lower shoe 110. The preferred position is shown in FIG. 8. The knurl 114 of the lower shoe 110 is attached to a first support 140 and pivots about a first fixed axis 142. The knurl 124 of the upper shoe 120 is attached to a second support 141 and pivots about a second fixed axis 143 that is parallel to the first fixed axis 142. The first and second fixed axes 142 and 143 are perpendicular to the lower and upper shoes 110 and 120, respectively. The supports 140 and 141 are opposite each other so that the distal end 122 of the upper shoe is over the proximal end 111 of the lower shoe, and the distal end 112 of the lower shoe is under the proximal end of the upper shoe.

The structure of this embodiment also offers some of the same advantages of the embodiments discussed above. In addition, this embodiment provides some flexibility in configuring the relative overlapping positions of the shoes because each shoe contains a blade spring. Likewise, because there is more than one blade spring, different strength springs may be used to detune the natural frequency of the tensioner, or provide a progressive spring constant.

In the operation of a dual blade chain tensioner, according to the present invention, the tensioner functions to damp chain oscillation and vertical vibrations. The vertical vibration or oscillation of the chain 3 is damped because of the advantageous use of the overlapping configuration of the shoes 10 and 20. For example, as shown in FIG. 6, an upward force from the blade spring deflecting to a more arcuate shape causes the upper shoe 20 to rotate in an opposite clockwise direction from the lower shoe 10. This opposite rotation translates to a sliding movement of the lower concave surface 28 of the upper shoe relative to the opposing upper convex surface 16 of the lower shoe. By creating a resistance to the sliding movement of the shoes, the deflection of the blade spring is also resisted. This resistance damps the blade spring reaction to vertical movement and tension variation in the chain, thereby damping prolonged chain oscillation due to the blade spring reaction.

The resistance to the sliding movement of the shoes is due in part to the friction between the opposing surfaces 16 and 28. Preferably, the materials selected for the lower shoe 10 and upper shoe 20 will deform similarly under the temperature and load during operation to maintain a similar arcuate shape so that the opposing surfaces 16 and 28 closely mate over a large surface area 35. It is believed that this large surface area 35, or slidable contact region, introduces a substantial frictional force that resists the relative sliding movement of lower and upper shoes 10 and 20. The shoes can be made of various materials to provide different frictional coefficients for the opposing surfaces 16 and 28. The frictional coefficient can also be varied by variously treating the sliding surfaces 16 and 28. The friction can be changed by changing the area of the slidable contact region 35 by varying the lengths of the arms 13 and 23, or the positions of the supports 40 and 41. Preferably, the arms 13 and 23 have similar length and symmetry so that the spring tension and the opposing chain loads evenly distribute the frictional force under various operating conditions.

In addition to friction, the movement of the shoes 10 and 20 is damped by a viscous component. The overlapping shoes 10 and 20 are adapted to receive a viscous fluid between the sliding surfaces 16 and 28 that damps the relative movement of the shoes 10 and 20. Preferably, the viscous fluid is engine oil. During operation, a fine oil mist is sprayed in the timing chain box. The contacting opposing surfaces 16 and 18 create a capillary action that draws in an oil film in the slidable contact region 35. The layer of oil formed in the slidable contact region 35 adds a viscous drag to the relative sliding movement of the opposing surfaces 16 and 28. It is believed that the advantage of the viscous fluid is that the damping is not as dependent on the precise surface to surface contact that friction is dependent upon, because the oil fills the gaps between the opposing surfaces. It is believed that the force required to shear the oil may be greater than the force required to overcome the friction. The load required to shear the film of oil is sufficiently high to resist sliding movement of the shoes due to higher frequency vibrations associated with small vertical oscillations of the chain.

In addition, the overlapping configuration of the shoes allow the blade spring to extend to a more arcuate shape to maintain tension on an elongated chain at the extreme range of its vertical movement. In particular, chains with a longer sprocket gear center length will have a greater vertical deflection associated with the chain elongation. For example, as compared with the chain when new, an aged, elongated chain may deflect up to an additional five millimeters. To maintain the same tension on the elongated chain, the tensioner must operate with a more arcuate shape. The overlapping shoe configuration allows the shoes to slide and "open" to permit the blade spring to bend to a more arcuate shape. The overlapping shoes do not hold against the spring tension. Therefore, a lower initial blade spring tension is acceptable to achieve the extreme arcuate shape necessary to meet the extended vertical range of an elongated chain.

The present invention also contemplates a method for assembling a dual blade chain tensioner. For example, as shown in FIGS. 4–6, a dual blade chain tensioner 1 is assembled as follows. The lower and upper shoes 10 and 20 are pivotally mounted on supports 40 and 41, respectively. The shoes 10 and 20 are rotated apart to permit access to the spring slots 17 and 27. The first end 31 of the blade spring 30 is inserted into the spring slot 17 of the lower shoe 10 and the second end 32 of the blade spring 30 is inserted into the spring slot 27 of the upper shoe 20. The lower shoe 10 is rotated towards the blade spring 30. Then the upper shoe 20 is rotated toward the blade spring 30 so that it overlaps the lower shoe 10. Force is continually applied on the upper shoe 20 to press the lower shoe 10 against the blade spring 30 until the blade spring 30 deforms to about the same arcuate shape as the arm 13 of the lower shoe 10. The spring tension at the ends 31 and 32 of the blade spring 30 tightly engage the spring slots 17 and 27 to hold the blade spring 30 in position. A temporary locking pin 45 may then be placed over the second end 22 of the upper shoe 20 to hold the shoes 10 and 20 in position against the tension of the deformed blade spring 30.

After the assembly is installed adjacent to a chain 3 in an engine, the temporary locking pin 45 may be removed. This releases the blade spring 30 to spring towards a more arcuate shape. This spring tension will force the shoes 10 and 20 upwards towards the chain 3. The opposing tension the chain 3 deform the shoes 10 and 20 to a more arcuate shape corresponding to the blade spring.

The present invention advantageously adapts improvements in the art of chain tensioners to create a damping feature by using overlapping shoes. The damping reduces the oscillation and vertical movement of the chain. The overlapping shoe configuration also reduces the amount of spring tension pre-load required, particularly on timing chains having a longer center distance. With a longer center distance, the chain has a potentially greater range of vertical motion. The overlapping shoes can extend to a greater arcuate shape to maintain tension on the chain at extreme vertical positions with a lower requirement for the spring tension pre-load.

Those skilled in the art to which the invention pertains may make modifications and other embodiments employing the principles of this invention without departing from its spirit or essential characteristics, particularly upon the foregoing teachings. The described embodiments are to be considered in all respects only as illustrative and not restrictive, and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

I claim:

1. A chain tensioner comprising:
   a first shoe attached to a support surface, said first shoe having an upper and lower surface;
   a second shoe pivotally attached to a support surface, said second shoe having an upper and lower surface, said upper surface of said second shoe being positioned to impart tension to a chain, said second shoe lower surface overlapping a portion of the supporting surface of first shoe; and
   a blade spring engaging the first shoe, and imparting a tension to said first shoe.

2. The chain tensioner of claim 1 wherein said upper surface of said first shoe is arcuately shaped, said lower surface of said second shoe is arcuately shaped, and the lower surface of said second shoe slidably contacts at least a portion of the upper surface of said first shoe.

3. The chain tensioner of claim 2 wherein said tensioner includes a viscous fluid layer between the upper surface of said first shoe and the lower surface of said second shoe.

4. The chain tensioner of claim 1 wherein the second shoe is formed of a plastic material that is capable of deformation when subjected to a load at an elevated temperature.

5. The chain tensioner of claim 4 wherein the first shoe is formed of different material than the second shoe.

6. The chain tensioner of claim 1 wherein each of said upper surfaces of each shoe has a proximal end and a distal end, said proximal end is closer to the attached end of each shoe, each of said upper surfaces having a length defined by the distance between the proximal and distal end, said second shoe length exceeding the length of the first shoe.

7. The chain tensioner of claim 6 wherein said first shoe is fixedly attached to said support surface.

8. The chain tensioner of claim 1 wherein:
   said first shoe includes a first end that defines a spring slot;
   said second shoe includes a first end that defines a spring slot; and
   said blade spring includes a first end and second end, wherein the blade spring first end engages the spring slot of the first shoe and the blade spring second end engages the spring slot of the second shoe.

9. The chain tensioner of claim 8 wherein the first end of the first shoe is pivotally attached to a second support opposite the first support.

10. The chain tensioner of claim 9 wherein:
    the first shoe includes a knurl that depends from the first end and is pivotally attached to a first support to pivot about a fixed axis that extends substantially perpendicular to the shoe, said spring slot being disposed in the knurl;

the second shoe includes a knurl that depends from the first end and is pivotally attached to a second support to pivot about a second fixed axis that extends substantially perpendicular to the shoe, said spring slot being disposed in the knurl; and
    the blade spring contacts the lower surface of the first shoe and is substantially spaced apart parallel to the lower surface of the second shoe, with the first shoe being disposed between the blade spring and the second shoe.

11. The chain tensioner of claim 8 wherein said blade spring is arcuately shaped at a first formation radius, said lower surface of the first shoe is arcuately shaped at a second formation radius, with said first formation radius being less than the second formation radius such that when said blade spring is engaged in said spring slots and elastically deformed to approximately correspond to the flatter arcuate shape of said lower surface of said first shoe, said blade spring imparts a spring tension to the shoes.

12. The chain tensioner of claim 2 wherein:
    said first shoe further includes a chamber, a first end, and a second end;
    said second shoe further includes a chamber, a first end, and a second end;
    said first blade spring is disposed within said chamber of said first shoe; and
    a second blade spring is disposed within said chamber of said second shoe.

13. The chain tensioner of claim 12 wherein the first end of the first shoe is pivotally attached to a first support, the first end of the second shoe is pivotally attached to a second support, with the first support and the second support aligned so that the axes of rotation of the first and second shoes are substantially parallel.

14. The chain tensioner of claim 12 wherein the second end of the first shoe slidably contacts a stop.

15. The chain tensioner of claim 12 wherein said tensioner includes a viscous fluid layer between the upper surface of the first shoe and the lower surface of the second shoe.

16. The chain tensioner of claim 12 wherein said first end of the first shoe and said first end of the second shoe are pivotably mounted on opposing supports such that said second end of the first shoe extends towards said first end of the second shoe, and said second end of the second shoe extends towards said first end of the first shoe.

17. The chain tensioner of claim 12 wherein:
    said first shoe is formed of a plastic material that is capable of creep deformation when subjected to a load at an elevated temperature, said first end of the first shoe has a bore for pivotal attachment to a first support;
    said second shoe is formed of a plastic material that is capable of creep deformation when subjected to a load at an elevated temperature, said first end of the second shoe has a bore for pivotal attachment to a second support;
    said first blade spring is arcuately shaped and elastically deformed to impart a spring tension on the first shoe; and
    said second blade spring is arcuately shaped and elastically deformed to impart a spring tension on the second shoe.

18. A method for assembling a dual blade type chain tensioner, comprising:
    providing a rectangular blade spring having a first end and a second end and an arcuate shape;
    providing a first tensioner shoe having an upper surface, and a spring slot in a first end attached to a supporting surface;

providing a second tensioner shoe having a lower surface, an upper surface, and a spring slot in a first end pivotally attached to a supporting surface;

positioning a first end of the blade spring into the first shoe spring slot;

positioning a second end of the blade spring into the second shoe spring slot;

rotating a second end of the second shoe over the first shoe towards the blade spring;

overlapping the lower surface of the second shoe over the upper surface of the first shoe; and deforming the blade spring elastically to correspond to a less arcuate shape.

19. The method of claim 18 further comprising:

placing a temporary locking pin against the second shoe to hold said first shoe and said second shoe in position against the tension of the blade spring.

* * * * *